Figure 1:
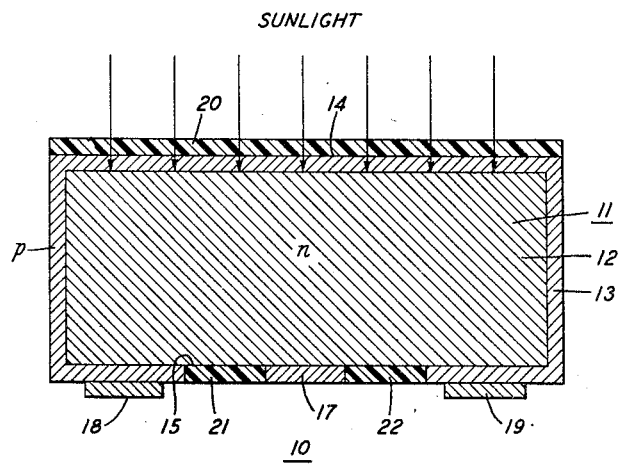

Feb. 5, 1957 D. M. CHAPIN ET AL 2,780,765
SOLAR ENERGY CONVERTING APPARATUS
Filed March 5, 1954

INVENTORS: D. M. CHAPIN
C. S. FULLER
G. L. PEARSON
BY
Arthur J. Torsiglieri
ATTORNEY United States Patent Office 2,780,765
Patented Feb. 5, 1957

2,780,765

SOLAR ENERGY CONVERTING APPARATUS

Daryl M. Chapin, Basking Ridge, Calvin S. Fuller, Chatham, and Gerald L. Pearson, Bernards Township, Somerset County, N. J., assignors to Bell Telephone Laboratories, Incorporated, New York, N. Y., a corporation of New York Application March 5, 1954, Serial No. 414,273

12 Claims. (Cl. 320—2)

This invention relates to apparatus for converting solar radiation into electrical energy and more particularly to apparatus which utilizes solar energy to charge a storage battery.

An object of the invention is to harness solar energy for creating electrical energy in an economical and efficient manner. By utilizing solar energy when available to charge a storage battery, there can be provided a continuing supply of electrical energy.

The idea of converting solar radiation into electrical energy is one that has occupied men's minds for years. Sunlight is the most common, most accessible, and most economical form of energy on the earth's surface. Yet although a number of expedients have been proposed hitherto for harnessing solar energy, none has proven sufficiently efficient to be practical. In particular, it has not been possible conveniently hitherto to realize overall efficiencies significantly greater than one percent.

One of the basic difficulties in achieving high efficiencies in many such prior art expedients has been that they have generally utilized the solar energy as fuel for heating a suitable agent and then utilizing temperature differences in the agent for creating electrical energy. Such expedients are intrinsically inefficient because of the large thermal conduction losses resulting from the heating cycle.

It is in accordance with the invention to utilize as the solar energy converter a specially designed semiconductive body including a p-n junction.

Conduction occurs in electronic semiconductors by means of two types of charge carriers, electrons and holes. These carriers can be provided in the semiconductor in several ways including the presence of certain elements in the crystal structure which have either an excess or deficit of valence electrons so that they provide a source of unbound holes or electrons which can be displaced by the application of a low level of external energy to the crystal. Generically, those semiconductors wherein conduction is in the main by electrons are called n-type while those where conduction occurs by holes are called p-type. The conductivity transition region between zones of opposite conductivity type in a semiconductive body is known as a p-n junction.

It has been known hitherto that light of an appropriate wavelength falling on a p-n junction serves as a source of external energy to generate hole-electron pairs in the semiconductive body. Because of the potential difference which exists at a p-n junction, holes and electrons move thereacross in opposite directions, giving rise to a current flow capable of delivering power to an external circuit. However, hitherto photovoltaic devices of this kind have not been successfully used as power sources, since in their usual form they are incapable of providing any appreciable amount of power efficiently. In particular, it had not been thought likely hitherto that they could be made to supply sufficient power to charge a storage battery capable of doing any useful amount of work.

However, it has been found that such a device is particularly well suited for this purpose since a battery serves as a load whose resistance varies with charging current in a manner corresponding to the resistance variations of a p-n junction under the influence of incident radiation whereby the device is working into a well-matched load over a wide range of incident light values.

There are several factors which in the past have militated against high efficiencies in the use of a semiconductive device including a p-n junction as a converter of solar radiation. First, the usual semiconductive surface tends to reflect a large fraction of the incident radiation, thereby reducing the radiation available for conversion. Additionally, the recombination of electron-hole pairs formed by the incident radiation before they reach the p-n barrier can be a source of considerable loss. Since penetration into a semiconductive body of solar radiation is extremely shallow over most of the useful spectrum it becomes important in this regard to place the p-n barrier as near to the surface as possible. This, however, is inconsistent with the further requirement for low losses that the resistance of the semiconductive body and of ohmic connections thereto be low.

The present invention provides a p-n photosensitive element or cell which overcomes all of these problems successfully, and is capable of efficiencies of greater than five percent.

A principal feature of the invention is a photovoltaic cell comprising a monocrystalline silicon body including a p-n junction of which the thinner of the two zones forming the junction has a thickness comparable to the diffusion length of minority carriers therein and a specific resistivity considerably lower than that of the thicker of the two zones. In a preferred form, the thin zone is formed by the diffusion of boron into the silicon body for converting to p-type a surface portion of an originally n-type body.

The choice of silicon as the semiconductive material provides certain initial advantages. Silicon is plentiful, being next to oxygen the most abundant element in the earth's crust. Moreover, the use of silicon facilitates the problem of minimizing reflection losses. On exposure to the atmosphere even in the absence of a protective coating the silicon surface will acquire a transparent oxide coating which will have a refractive index intermediate between that of the atmosphere and that of the silicon body whereby reflection is minimized. This tendency of silicon to form a protective coating of its own makes it unnecessary to provide heavy protective coatings. Additionally, silicon is very stable at the temperatures normally to be expected in this use.

The choice of boron as the significant impurity in conjunction with the silicon body to form the p-type surface layer provides further important advantages. As described in application Serial No. 414,272, filed March 5, 1954, by C. S. Fuller, techniques are now available for the diffusion of boron from the vapor state into an n-type silicon body to form extremely thin, uniformly low-resistivity p-type surface layers. This makes feasible a p-type layer sufficiently thin to be nearly transparent to the incident radiation and of sufficiently low resistance to avoid high internal losses. Additionally, it is found convenient to electroplate directly to the thin smooth boron-diffused layer for forming a low resistance ohmic connection thereto. This is in contradistinction to various other types of impurity-diffused layers which have required sandblasting as a prelude to electroplating, an expedient not convenient here unless measures are first taken to build up the thickness of the p-type area. Finally, it is found that a boron-diffused layer of this kind is extremely stable, resulting in reliable operation over an extended life.

In an illustrative embodiment of the invention, a plurality of silicon elements or cells of the kind described above are serially connected for charging a storage battery. The term "storage battery" is intended in a generic sense. In arrangements of this kind, it is important to isolate the silicon cells from the storage battery at times when they are not charging the battery to avoid their acting as a load and discharging the battery. To this end, there is included serially connected with the battery and silicon cells a unilaterally conducting element which provides a low impedance to battery charging currents and a high impedance to battery discharging currents.

Arrangements of this kind will be particularly well adapted for serving to power transistorized repeater stations in a rural carrier telephone system. In such a system, the repeater stations will be widely scattered in remote places and it will be a matter of considerable expense to power such stations by conventional means. A repeater station of this kind will need approximately 0.2 watt of power for operation. It is expected that at most locations a solar energy converter which provides a power of approximately one watt under the usual sunlight conditions will be adequate to keep charged a storage battery suitable for serving as a power source for such a repeater station.

Figure 2:
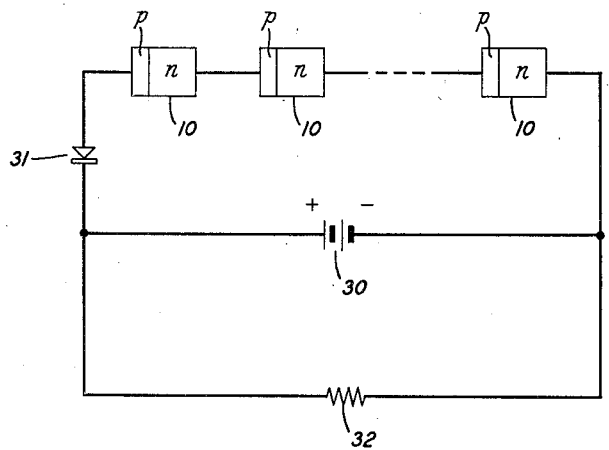

The invention will be more fully understood from the following more detailed description taken in conjunction with the accompanying drawings in which:

Fig. 1 shows in cross section a p-n silicon body suitable for serving as a photovoltaic cell in accordance with the invention; and Fig. 2 shows schematically a plurality of cells of the kind shown in Fig. 1 connected serially for charging a storage battery in accordance with this aspect of the invention.

The cell 10 shown in Fig. 1 will be described, by way of example for purposes of illustration, with specific reference to one which has been built and found to provide power from solar radiation into a resistance load at the rate of more than 55 watts per square meter of cell surface area. The cell comprises a silicon body 11 which is a rectangular parallel piped. The body 11 includes an inner n-type zone 12 having a resistivity of approximately 0.1 ohm centimeter and an outer p-type boron-diffused zone 13 having a resistivity of approximately 0.001 ohm centimeter. It is desirable that each of the zones be of low resistivity to minimize internal losses and so to maximize the voltage available as a useful output, but it is also advantageous to have a difference in the resistivities of the two zones to avoid poor reverse current charactertistics. It is also important that the thin p-type zone be of low resistivity to facilitate making low resistance ohmic connection thereto. It is further noted that the desired difference in resistivities of the two zones forming the p-n junctions is more advantageously realized by making the n-type zone of higher resistivity. Moreover, for the most efficient use of the incident radiation, it is advantageous that the p-type zone 13 be extremely thin, at least on the front surface 14, which is to be exposed to the incident radiation so as to be as transparent as possible to the incident radiation which should penetrate as closely as possible to the p-n junction. In this way recombination losses will be minimized. In particular, it is important for efficient operation that the thin p-type layer should be no thicker than the order of the diffusion length of the minority carriers, the electrons, in the p-type zone. In the embodiment being described, the p-type layer 13 is no more than 0.1 mil thick and the n-type zone approximately 40 mils thick. Thickness is desirable for the n-type zone to provide mechanical rigidity to the body. Such a body can be formed by heating an n-type silicon wafer of 0.3 ohm centimeter resistivity to a temperature of approximately 1000° centigrade for about 5.5 hours in an atmosphere of boron trichloride at 15 centimeters of mercury pressure. The p-type outer layer is etched away along a central portion of the back surface 15 of the body to expose a strip of the n-type zone for making ohmic connection thereto.

Low resistance connections are made to the n- and p-type zones by electroplating coatings of a suitable noncontaminating metal, such as rhodium, in elongated strips 17, 18, 19 on the back surface 15 of the cell, leaving the front surface 14 completely exposed to the incident radiation. The intermediate coating strip 17 makes connection to the exposed surface of the n-type zone, and the coatings 18 and 19 on opposite sides thereof each make connection to the p-type zone. As mentioned briefly above, it is an advantage of a boron-diffused p-type layer that rhodium can be electroplated directly thereto without first roughening the surface. The importance of this can be better appreciated when it is noted that the p-type layer is advantageously only about 0.1 mil thick. This is in contradistinction to silicon photovoltaic cells in which a p-type zone has a thin phosphorous-diffused n-type surface layer, such cells forming inferior substitutes to those of the kind described. Copper leads may then be connected to these coatings for abstracting the generated power, the leads to coatings 18 and 19 being positive with respect to the lead to coating 17.

As indicated above, to minimize reflection losses it is desirable to treat the front surface 14 of the cell. For this purpose, it is advantageous to provide a thin coating 20 of polystryene on this surface. Polystyrene has an index of refraction of approximately 1.6; which is roughly the geometric mean of the index of refraction of free space and of purified silicon, so that it serves to minimize reflection losses. Alternatively, the silicon surface can be oxidized by heating in $H_2O$ vapor and the oxide coating will thereafter serve to minimize reflection losses.

It is also desirable to maintain a high leakage resistance between coatings 18, 19 and coating 17. For this purpose, it is advantageous to coat the intermediate regions 21, 22 therebetween with wax or other suitable compound to seal off moisture and insure a high resistance leakage path.

At present, it is found preferable to limit the size of the surface area of a single cell since too long a path for the charge carriers in the body makes for high internal losses. For large currents a plurality of cells are combined in parallel; for large voltages a plurality of cells are combined in series. In embodiments which have been constructed of the kind described, an open circuit voltage of approximately 0.52 volt per cell is obtained.

Fig. 2 illustrates schematically an arrangement for charging a storage battery 30 which by means of solar radiation is supplying a load represented schematically as the resistance 32. A plurality of cells 10, of the kind described above, are connected in series-aiding relationship to provide a net voltage adequate for charging purposes. It may be desirable in specific arrangements to utilize a number of cells in parallel to provide a higher charging current than is conveniently available from a single cell. It is characteristic of these cells that when active, the induced current flow within the cell is in the reverse direction. As a result when passive, these cells will be biased in the forward direction, or direction of low resistance, by the charged battery 30, and so represent a low resistance load thereto which tends to drain the battery. To obviate this difficulty, it becomes important to insert in series with cells 10 and battery 30 a unilaterally conducting element 31, for example a crystal diode, poled to provide a low resistance to charging currents developed by the cells but high resistance to any discharging currents from the battery through the cells.

In field use, it will be advantageous to support the various cells in a position inclined to the horizon, the optimum degree of incline being related to the latitude of the site. It may be advantageous to utilize cells inclined by varying amounts to achieve an averaging out effect over the day. It may be desirable additionally to provide some arrangement for concentrating the sunlight on the cells. A cylindrical or parabolic reflector will be helpful in concentrating radiation on the cells independent to some extent of the exact position of the sun. It will be obvious that various techniques of this kind can be employed to enhance the amount of sunlight incident on the cells.

What is claimed is:

1. An arrangement for utilizing solar radiation for keeping charged a storage battery comprising a storage battery to be charged, at least one photosensitive element comprising a silicon body including an n-type zone contiguous with a p-type zone including a concentration of boron impurities, the thickness of the p-type zone being of the order of the diffusion length of electrons therein, and a unilaterally-conductive element serially connected with said storage battery and photosensitive element, and poled to pass charging currents developed by the photosensitive element and to block discharging currents from the battery through the photosensitive element.

2. An arrangement for utilizing solar radiation for keeping charged a storage battery comprising a storage battery to be charged, at least one photosensitive element comprising a silicon body having a thin surface zone of one conductivity type contiguous with a thicker zone of opposite conductivity type, the specific resistivity of the thin zone being considerably less than the specific resistivity of the thick zone and the thin zone being exposed to incident solar radiation, and a unilaterally-conductive element serially connected with said storage battery and photosensitive element, and poled to pass charging currents developed by the photosensitive element and to block discharging currents from the battery through the photoesensitive element.

3. An arrangement for utilizing solar radiation for keeping charged a storage battery comprising a storage battery to be charged, at least one photosensive element comprising a silicon body including an n-type zone contiguous with a transparently thin p-type zone for penetration of solar radiation to the p-n junction, the p-type zone having a specific resistivity substantially less than that of the n-type zone and a unilaterally-conductive element serially connected with said storage battery and photosensitive element, and poled to pass charging currents developed by the photosensitive element and to block discharging currents from the storage battery through the photosensitive element.

4. A photovoltaic element for converting solar radiation into electrical energy comprising a silicon body having an n-type zone and a p-type zone contiguous therewith for forming a p-n junction, the thinner of the two zones having a thickness of the order of the diffusion length of the minority carriers therein and a specific resistivity considerably lower than that of the thicker of the two zones, and ohmic connections to said zones across which is developed a voltage.

5. A photovoltaic element in accordance with claim 4 characterized in that the thinner zone envelops the thicker zone over a major portion of the latter's surface area.

6. A photovoltaic element for converting solar radiation into electrical energy comprising a silicon body having a relatively thick n-type zone and contiguous thereto a relatively thin p-type zone characterized by a predominance of boron impurities and ohmic connections to the two zones across which is developed a voltage.

7. A photovoltaic element in accordance with claim 6 further characterized in that the p-type zone envelops the n-type zone over a major portion of the latter's surface area.

8. A photovoltaic element for converting solar radiation into electrical energy comprising a silicon body having an n-type zone of approximately 0.3 ohm centimeter resistivity and contiguous thereto a p-type zone approximately 0.1 mil thick and having a predominance of boron impurities for providing a resistivity of 0.001 ohm centimeter, a transparent coating on the p-type surface having an index of refraction intermediate that of free space and the silicon body, and ohmic connections to the two zones for developing a voltage thereacross.

9. A photovoltaic cell for the conversion of solar radiation into electrical energy comprising a silicon body including an n-type zone and contiguous thereto for forming a large area planar p-n junction a boron-diffused p-type surface zone of thickness comparable to the diffusion length of electrons therein.

10. An arrangement for charging a storage battery by means of solar radiation comprising a plurality of photosensitive elements serially connected, each comprising a silicon body having an n-type zone and contiguous thereto a p-type zone having a predominance of boron impurities to provide a resistance of approximately .001 ohm centimeter and of a thickness of 0.1 mil to be appreciably transparent to solar radiation, a transparent coating on the p-type surface having an index of refraction intermediate that of free space and that of the silicon body, and ohmic connections to the two zones, and a unilaterally-conductive element serially connected with said battery and said plurality of elements poled to pass charging currents and to block discharging currents.

11. In combination, a series arrangement of a photovoltaic element in accordance with claim 6 and utilization means.

12. In combination, a series arrangement of a plurality of photovoltaic elements in accordance with claim 9 and utilization means.

References Cited in the file of this patent

UNITED STATES PATENTS

| | | |
|---|---|---|
| 2,402,582 | Scaff | June 25, 1946 |
| 2,402,662 | Ohl | June 25, 1946 |
| 2,423,125 | Teal | July 1, 1947 |
| 2,443,542 | Ohl | June 15, 1948 |
| 2,544,211 | Barton | Mar. 6, 1951 |
| 2,589,704 | Kirkpatrick et al. | Mar. 18, 1952 |
| 2,606,313 | Bell | Aug. 5, 1952 |
| 2,631,356 | Sparks et al. | Mar. 17, 1953 |